United States Patent [19]

Dann

[11] 3,794,940

[45] Feb. 26, 1974

[54] SIGNAL CORRECTING APPARATUS

[75] Inventor: Bert H. Dann, Mountain View, Calif.

[73] Assignee: Bell & Howell Company, Chicago, Ill.

[22] Filed: May 18, 1972

[21] Appl. No.: 254,802

[52] U.S. Cl. .................................... 333/77, 333/78

[51] Int. Cl. ............................................ H01h 7/08

[58] Field of Search .......................... 333/77, 78, 76

[56] References Cited

UNITED STATES PATENTS

| | | | |
|---|---|---|---|
| 2,509,062 | 5/1950 | Horner | 333/78 |
| 3,019,401 | 1/1962 | Heuer | 333/77 |
| 3,029,400 | 4/1962 | Nelson | 333/77 |
| 3,114,889 | 12/1963 | Avins | 333/77 X |
| 3,571,767 | 3/1971 | Bush | 333/76 |
| 3,671,889 | 6/1972 | Favors | 333/76 |
| 2,907,960 | 10/1959 | Avins | 333/77 X |

*Primary Examiner*—Eli Lieberman
*Assistant Examiner*—Saxfield Chatmon, Jr.
*Attorney, Agent, or Firm*—Benoit Law Corporation

[57] ABSTRACT

An improved apparatus for correcting effects of angular errors in chrominance sideband components of a color video signal in which the chrominance sideband components, and signals indicative of the angular errors, as well as a substantially stable reference signal, are heterodyned to redispose the chrominance sideband components about a frequency which is displaced from a picture carrier frequency by a stable frequency difference.

The disclosure also covers an improved band filter useful in the above mentioned and other apparatus.

4 Claims, 4 Drawing Figures

SIGNAL CORRECTING APPARATUS

This is a division of application Ser. No. 133,646, filed Apr. 13, 1971.

CROSS REFERENCES TO RELATED APPLICATIONS

Patent application Ser. No. 872,847, filed Oct. 31, 1969, by Bert H. Dann, and assigned to the subject assignee; now U.S. Pat. No. 3,678,397;

Patent application Ser. No. 872,848, filed Oct. 31, 1969, by Bert H. Dann, and assigned to the subject assignee, now U.S. Pat. No. 3,634,616;

Patent application Ser. No. 873,284, filed Nov. 3, 1969, by Bert H. Dann, and assigned to the subject assignee, now U.S. Pat. No. 3,697,673;

Patent application Ser. No. 56,787, filed July 21, 1970, by Bert H. Dann, and assigned to the subject assignee, now U.S. Pat. No. 3,663,743;

Patent application Ser. No. 873,416, filed Nov. 3, 1969, by Bert H. Dann and Floyd M. Gardner, and assigned to the subject assignee; now U.S. Pat. No. 3,629,491.

BACKGROUND OF THE INVENTION

1. Field of the Invention

The subject invention relates to signal processing systems and, more particularly, to apparatus for correcting effects of angular errors in video signals.

2. Description of the Prior Art

The desire to improve methods and apparatus for correcting effects of angular errors in video signals has received renewed impetus from the advent of color video tape recording systems. Accordingly, the prior art and the subject invention will be described in terms of relevant problems arising in connection with color video signal recording and playback systems, although the invention is not limited to that field, as those skilled in the art will appreciate.

Briefly stated, a composite color video signal comprise a luminance component and a chrominance component. The latter includes phase and amplitude modulated components disposed about a suppressed subcarrier which, in the NTSC system, nominally oscillates at 455 times half-line frequency or at approximately 3.58MHz. In certain low-cost industrail systems, the latter half-line frequency factor is not necessarily observed, although the nominal line-scan and solor-subcarrier frequencies correspond very closely to those of the NTSC system.

If a composite color video signal is recorded on and reproduced from magnetic tape, to name an example, factors such as flutter and wow in the recording and playback processes, tape shrinking and elongation, and head -to-tape spacing irregularities produce angular variations in the reproduced video signal.

Such angular errors in the luminance component are generally tolerated by the eye, particularly if they are kept within sensible limits by the use of adequate recording and playback machines. By contrast, the above mentioned nature of the chrominance component makes this component particularly vulnerable to angular errors, as is easily seen from the fact that the phase-modulated component in the chrominance signal contains color hue information and that the eye is particularly sensitive to hue aberrations. Moreover, a shift in average frequency in the color reference carrier rate of the played-back video signal of typically more than about ± 100 to 200 Hz exceeds the pull-in range of the color-reference synchronization circuits of typical color monitors or color television receivers employed for viewing the played-back signal. This at least results in a complete random display of colors. In the vast majority of color television receiving sets, no color at all will, however, be displayed since the lack of color reference synchronization prevents the conventionally employed chroma gating or "color killer" circuits from enabling the color circuits of the set.

In an effort to counter these detrimental effects, the use of variable time delay devices for correcting time base errors in the reproduced singal has been proposed. These devices, however, are costly and introduced substantial complexities into the playback system. Moreover, their range of operation is typically limited, so that their use presupposes a preliminary error correction and the availability of high-precision recording and playback machines.

According to a more practical proposal, the degraded chrominance portion of the reproduced video signal is decoded into separate color components by means of a reference signal which reflects angular errors in the video signal and which is either derived from one or more pilot signals recorded and reproduced with the video signal, or from the color synchronizing signal or "color bursts" contained in the reproduced chrome signal.

In these systems, a certain measure of correction is realized from the fact that the decoding reference signal is affected with practically the same angular errors as the played-back chrominance signal.

Typically, the decoded color components are reconstituted on a stable carrier by means of a color encoder driven by a locally generated subcarrier. In theory, it would be possible to omit the latter encoding process and to apply the demodulated color components directly to the television set employed for viewing the played-back video program. This, however, would require direct access to the internal circuitry of the set, whereas the general endeavor moves in the direction of providing recording and playback equipment that does not require major intrusions into the viewing set circuitry.

Accordingly, both the above mentioned decoding and encoding stages and processes are generally required. This being the case, the prior art proposal under consideration in effect proceeds to the extent of breaking the color signal down into different color components just for the purpose of correcting angular errors therein. Such a drastic procedure is generally disadvantageous, since it implies too many sources of potential error which may further degrade the color signal.

A different approach is apparent from another proposal according to which the played-back color signal is separated from th bulk of the luminance signal and is heterodyned with a locally produced stable signal of a first frequency, while an error signal reflecting the degradation of the color signal is heterodyned with a locally produced stable signal of a second frequency. It can be seen that these heterodyning and subsequent sideband selecting operations produce two signals, each of which is afflicted with angular errors of the played-back color signal. Accordingly, it is possible to eliminate the effect of such errors by heterodyning the latter two signals with each other and selecting the difference-frequency component from the result of this heterodyning step.

By an appropriate selection of the respective frequencies of the signals participating in the heterodyning processes, the modulation components of the resulting color signal can be made to be disposed about a stable carrier of standard color subcarrier frequency.

SUMMARY OF THE INVENTION

The subject invention provides improved apparatus of the last-mentioned heterodyning type.

More specifically, the invention provides apparatus for correcting effects of angular errors in chrominance sideband components of a color video signal having a luminance portion and a picture carrier, comprising in combination:

first means for providing a first error signal indicative of said angular errors;

second means for providing a stable reference signal;

third means connected to said first and second means for providing a first heterodyned signal by heterodyning said first error signal and said stable reference signal;

fourth means connected to said third means for extracting a first predetermined sideband component from said first heterodyned signal;

fifth means for deriving said chrominance sideband component from said color video signal;

sixth means connected to said fourth and fifth means for providing a second heterodyned signal by heterodyning said first predetermined sideband component and said derived chrominance sideband components;

seventh means connected to said sixth means for extracting a second predetermined sideband component from said second heterodyned signal;

eighth means for providing a second error signal differing in frequency from said first error signal and being indicative of said angular errors;

ninth means connected to said seventh and eighth means for providing a third heterodyned signal by heterodyning said second predetermined sideband component and said second error signal;

10 means connected to aid ninth means for extracting a third predetermined sideband component from said third heterodyned signal;

11 means for deriving said luminance portion and picture carrier from said color video signal and for imposing a predetermined delay on said derived luminance portion and picture carrier; and 12 means connected to said tenth and eleventh means for combining said delayed luminance portion and picture carrier with said third predetermined sideband component to provide a color viode signal in which said chrominance sideband components are disposed about a frequency which is displaced from the frequency of said picture carrier by a stable frequency differenc .

From another aspect thereof, the invention provides apparatus for correcting effects of angular errors in chrominance sideband components of a color video signal, comprising in combination;

first means for providing first signal indicative of said angular error;

second means for providing a second signal having a stable frequency;

third means connected to said first and second means for providing a third signal representing a frequency summation of said first and second signals;

fourth means for deriving said chrominance sideband components from said color video signal;

fifth means connected to said third and fourth means for providing a fourth signal representing a frequency summation of said third signal and said derived chrominance sideband components;

sixth means for providing a fifth signal indicative of said angular errors and differing in frequency from said first error signal; and seventh means connected to said fifth and sixth means for providing a sixth signal representing a frequency difference between said fourth signal and said fifth signal, and including said chrominance sideband components disposed about said stable frequency.

From yet another aspect thereof, the invention provides a band-filter having a predeterminable coupling factor, comprising in combination:

a pair of input terminals;

a pair of output terminals;

a first transformer having a first terminal connected to one of said input terminals, a second terminal connected to the other of said input terminals, a third terminal, a fourth terminal, a first primary winding connected to said first and second terminals, and a first secondary winding connected to said third and fourth terminals;

a second transformer having a fifth terminal, a sixth terminal, a seventh terminal connected to one of said output terminals, an eighth terminal connected to the other of said output terminals, a second primary winding connected to said fifth and sixth terminals, and a second secondary winding connected to said seventh and eighth terminals;

first capacitive means connected to said first primary winding for providing a tuned input for said first transformer; and means for coupling said first secondary winding to said second primary winding consisting essentially of a lead connecting said third terminal to said sixth terminal and second capacitive means connected between said fourth and fifth terminals and providing a tuned input for said second transformer. Further according to the invention, the bandpass filter has a predeterminable coupling factor, $k$, of $$k=\sqrt{\left(\frac{1}{(N_{21}/N_{12})^2+1}\right)^{1/2}}$$

wherein $N_{12}$ is the number of turns of said first secondary winding, and $N_{21}$ is the number of turns of said second primary winding.

BRIEF DESCRIPTION OF THE DRAWINGS

The invention will become more readily apparent from the following detailed description of preferred embodiments thereof, illustrated by way of example in the accompanying drawings, in which.

DESCRIPTION OF THE PREFERRED EMBODIMENTS

Figure 1:
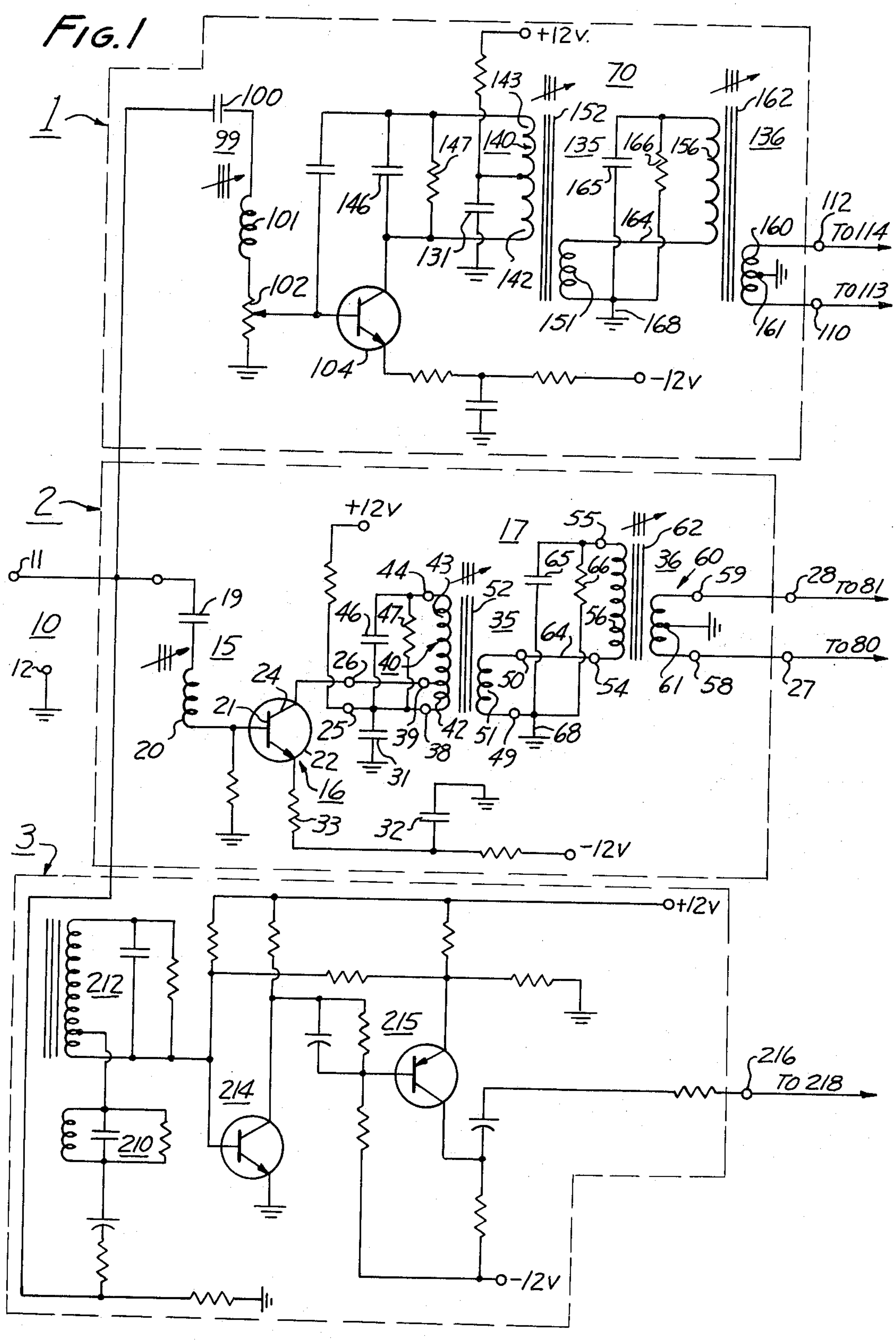
FIG. 1 is a diagram of a first part of a signal correcting apparatus according to a preferred embodiment of the invention.
Figure 2:
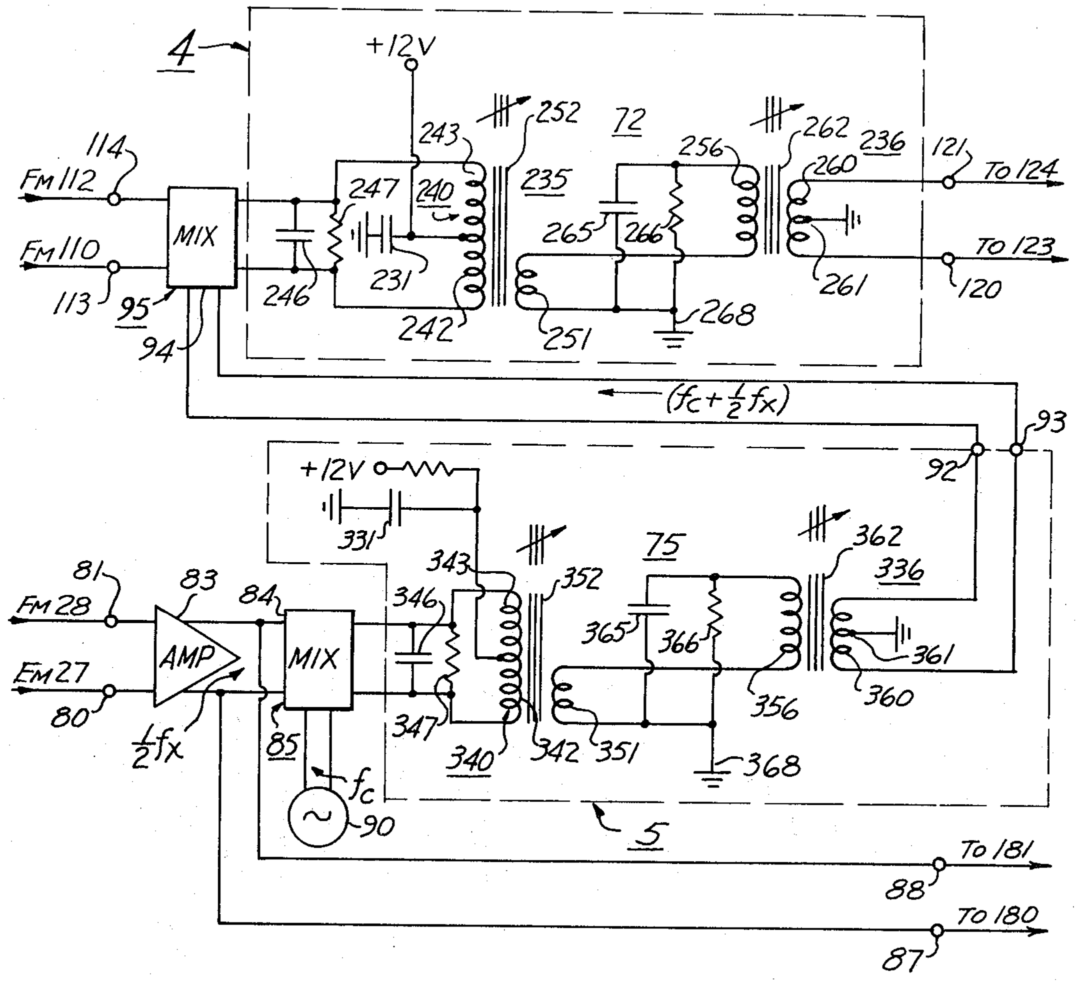
FIG. 2 is a diagram of a second part of a signal correcting apparatus according to a preferred embodiment of the invention.
Figure 4:
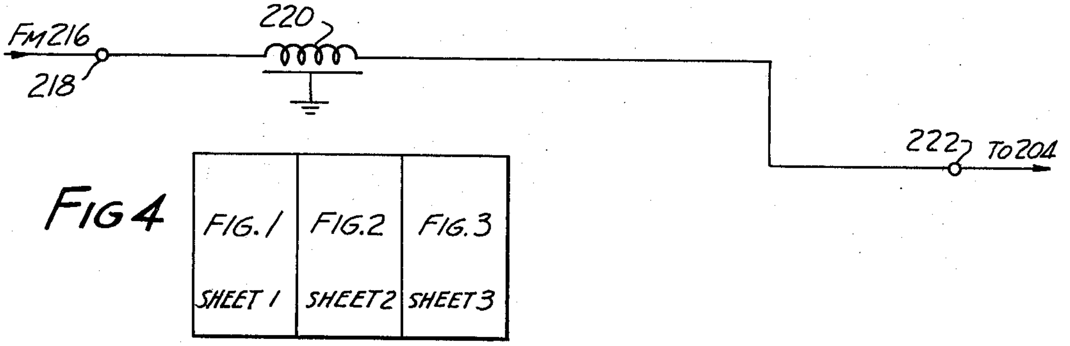
FIG. 4 is a diagram showing the interrelation of FIGS. 1, 2 and 3.
Figure 3:
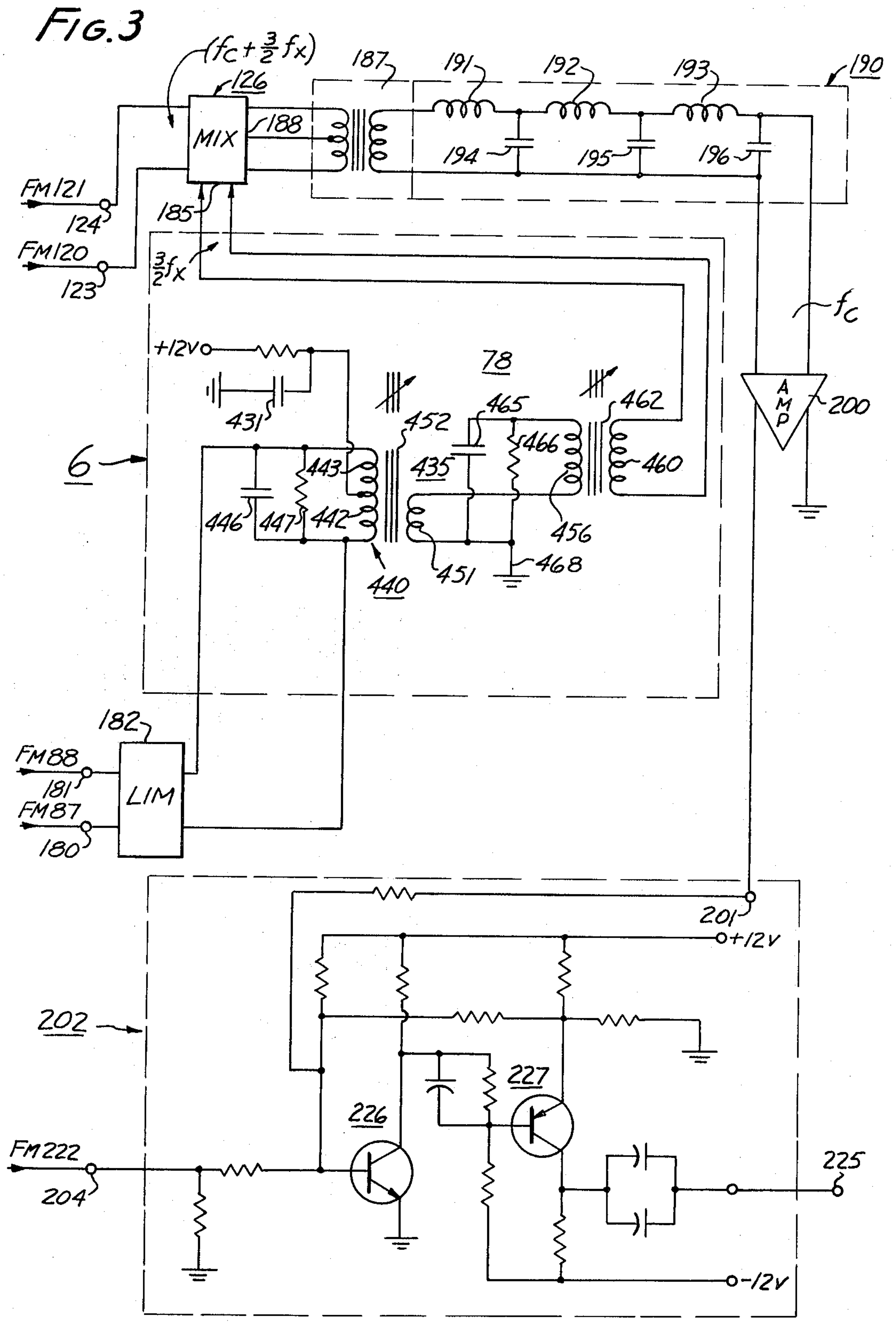
FIG. 3 is a diagram of a third part of a signal correcting apparatus according to a preferred embodiment of the invention.

The apparatus illustrated in FIGS. 1, 2 and 3 has an input 10 including the terminals 11 and 12 shown in FIG. 1. The input 10 is intended to receive a color video signal which has chrominance sideband components affected by angular errors, as is for instance the case with color video signals that have been recorded on an played back from magnetic tape (not shown).

The error-affected color video signal received at the input 10 is applied to a chroma bandpass amplifier 1, a pilot extractor 2, and a luminance bandpass amplifier 3. The pilot extractor 2 has the purpose of providing an error signal indicative of the above mentioned angular errors. As is well known in the prior art, suitable error signals may either be derived from the color burst signals of the played-back color video signal or from one or more pilot signals that have been recorded and subsequently played back together with the color video signal.

Provision of error signals from the color bursts has the advantage of dispensing with the necessity of an extra pilot signal, but has the disadvantage of limiting the accuracy of control by the fact that the color burst signal is only an intermittent, rather than a continuous, signal, Without intending any limitation to one or the other system, the assumption has been made in designing the illustrated apparatus that the play-back colo video signal received at the input 10 includes a pilot signal of a frequency of $\frac{1}{2}f_x$, wherein $$f_x = f_r\,(1 + \Delta) \tag{1}$$

with $f_r$ being the standard color subcarrier frequency (approximately 3.58MHz in the NTSC system) which prevailed at the time of recording, while $\Delta$ designates angular errors (typically time varying) in the played-back signal. If $f_r$ is approximately 3.58MHz, then $\frac{1}{2} f_x$ is approximately 1.79MHz.

Accordingly, the pilot extractor 2 is designed to extract from the composite signal applied to the input 10 a signal within band of 1.79MHz plus/minus $\Delta_{max}$. To this effect, the pilot extractor 2 includes a single tuned filter section 15, an amplifier stage 16 and a bandpass filter section 17. The filter section 13 includes a capacitor 19 and an inductor 20 connected in series between the input terminal 11 and the base 21 of a transistor 22 in the amplifier stage 16. The filter section 17 is connected to the collector 24 of the transistor 22 so as to receive the signal passed by the filter section 15 and amplified by stage 16.

The bandpass filter section 17 includes a pair of input terminals 25 and 26, and a pair of output terminals 27 and 28. The input terminal 25 is connected to the emitter 30 of the transistor 22 through a capacitor 31, ground, a capacitor 32, and a resistor 33. The input terminal 26 is connected to the transistor collector 24.

The bandpass filter section 17 further includes a transformer 35 and a transformer 36. The transformer 35 has a terminal 38 connected to the input terminal 25, and a terminal 39 connected to the input terminal 26. A primary winding 40 of the transformer 35 is connected to the terminals 38 and 39 as shown.

More specifically, the primary winding 40 in the preferred embodiment illustrated for the pilot extractor 2 has a section 42 connected between the terminals 38 and 39, and a section 43 connected between the terminal 39 and a further terminal 44. A capacitor 46 with a parallel-connected resistor 47 is connected between the primary winding terminals 38 and 44 to provide a tuned input for the transformer 35. The resistor 47 serves to adjust the Q-factor (quality factor, circuit magnification factor).

The transformer 35 further includes a terminal 49 and a terminal 50, and a secondary winding 51 connected between these terminals. The secondary winding 51 is inductively coupled to the primary winding through an adjustable transformer core 52. In my experiments, I have used a pot-core of a high-frequency magnetic material (mutually separated ferromagnetic particles contained in a plastic binder matrix) for the adjustable core 52.

The transformer 36 has a terminal 54 and a terminal 55, and a primary winding 56 connected between the terminals 54 and 55. The transformer 36 further includes a terminal 58 connected to the output terminal 27, a terminal 59 connected to the output terminal 28, and a secondary winding 60 connected between the terminals 58 and 59. The secondary winding 60, in turn, has a grounded center tap 61.

An adjustable transformer core 62 inductively couples the secondary winding 60 to the primary winding 56. In my experiments, I have used a pot-core of a high-frequency magnetic material of the above mentioned type for the core 62.

The terminal 50 of the transformer 35 is connected to the terminal 54 of the transformer 36 by a lead 64 which is isolated from ground as seen in FIG. 1. On the other hand, a capacitor 65 with parallel-connected resistors 66 connects the terminal 49 of the transformer 35 to the terminal 55 of the transformer 36, and provides a tuned input for th second transformer 36. The terminal 49 is, moreover, grounded at 68. The resistor 66 serves to adjust the Q-factor.

A bandpass filter of the type shown at 17 has a predeterminable coupling factor. More specifically, I have found that this bandpass filter has a coupling factor of $$k=\left[\frac{1}{(N_{56}/N_{51})^2+1}\right]^{1/2} \tag{2}$$

wherein $k$ is the coupling factor effective between the input terminals 25 and 26, and the output terminals 27 and 28, and $N_{51}$ is the number of turns of the secondary winding 51 of the transformer 35, while $N_{56}$ is the number of turns of the primary winding 56 of the transformer 36.

The fact that a coupling factor in bandpass filter is not subject to experiment but is predeterminable on the basis of the turns of two of the windings constitutes a material advance in the filter art.

In my experiments, I have found that the turns of the primary and secondary windings of the same transformers are preferably interwound for tighter coupling. Also, if the coupling factor is one tenth or less, the above formula (2) may with good approximation be simplified to:

$$k = N_{51}/N_{56} \quad (3)$$

In a practical prototype of the pilot extractor 2, I have, in addition to the above mentioned pot-cores, employed the following components:

Primary winding section 42 = 9 turns
Primary winding section 43 = 11 turns
Capacitor 46 = 110 pF
Resistor 47 = 18 kohms
Secondary winding 51 = 2 turns
Primary winding 56 = 20 turns
Secondary winding 60 = 4 turns
Capacitor 65 = 110 pF
Resistor 66 = 36 kohms Applying the formula (2), the coupling factor becomes:

$$k = \left[\frac{1}{(20/2)^2+1}\right]^{1/2} = 0.09900990 \quad (4)$$

The practically same result is obtained if the above formula (3) is applied:

$$k = 2/20 = 0.1 \quad (5)$$

It will now be recognized that the bandpass filter according to an aspect of the subject invention presents a material advance in the art, and has many applications in the electronics and communications field.

In the illustrated system, bandpass filters of the type of bandpass filter 17 are also employed at 70 in the chroma bandpass amplifier 1, at 72 in an upper sideband filter 4, at 75 in an upper sideband filter 5, and at 78 in a pilot signal tripler 6. To avoid crowding of the drawings, the illustration of the terminals 25, 25, 38, 39, 40, 49, 50, 54, 55, 58 and 59 is, however, not repeated for the filters 70, 72, 75, and 78.

As far as like or functionally equivalent or similar parts a among the filters 17, 70, 72, 75, and 78 are concerned, these are shown for the filters 70, 72, 75, and 78 with the corresponding reference numerals used for the filter 17 elevated by 100 for the filter 70, by 200 for the filter 72, by 300 for the filter 75, and by 400 for the filter 78. To name an example, the capacitor 46 becomes the capacitor 146 in the filter 70, the capacitor 246 for the filter 72, the capacitor 346 for the filter 75, the capacitor 446 for the filter 78, and so forth for the other filter parts.

The extracted pilot signal $\frac{1}{2} f_x$ provided at the terminal 27 and 28 of the pilot extractor 2 is applied to input terminals 80 and 81 of an amplifier 83 shown in FIG. 2. The amplifier 83 may, for instance, the a conventional two-stage amplifier and may, if desired, include a conventional limiter (not shown) for clipping amplitude excursions off the pilot signal.

The amplified $\frac{1}{2} f_x$ pilot signal is applied to an input 84 of a frequency mixer or modulator 85, as well as to a pair of terminals 87 and 88. The modulator 85, which may be of a conventional design, beats the amplified $\frac{1}{2} f_x$ pilot signal with a stable reference signal produced by a local oscillator 90. The stable reference signal produced by the oscillator 90 has a frequency of $f_c$ which corresponds to the frequency $f_r$ as defined above (about 3.58MHz in the NTSC system).

The bandpass filter 5 is designed to extract the upper sideband from the output signal produced by the above mentioned heterodyning action of the modulator 85. Accordingly, the signal provided at the output terminals 92 and 93 of the bandpass filter 5 has a frequency of $(f_c + \frac{1}{2} f_x)$.

This latter signal is applied to an input 94 of a conventional frequency mixer or modulator 95. The modulator 95 beats the $(f_c + \frac{1}{2} f_x)$ signal with chrominance sideband components extracted by the chroma bandpass amplifier 1 from the composite color video signal appearing at the input 10 shown in FIG. 1.

To this effect, the chroma bandpass amplifier 1 includes a tuned input circuit 99 composed of a capacitor 100, a coil or inductor 101, and a potentiometer 102, all connected in series between the input terminal 11 and ground. The tuned input circuit is designed to reject the pilot signal contained in the composite color video signal received at the systems input 10. The signal passed by the tuned input circuit 99 is amplified by the transistor stage 104 and is thereupon applied to the bandpass filter 70 designed to pass chrominance sideband components in the composite signal received at systems input 10. By way of example, the filter 70 may be designed so that the chroma bandpass amplifier passes a band from 3 to 4.1MHz with a drop-off about −10 db at either end of this range.

The extracted chrominance sideband components are applied to terminals 110 and 112 and from there to input terminals 113 and 114 of the modulator 95 shown in FIG. 2. The modulator 95 beats these chrominance sideband components and the above mentioned $(f_c + \frac{1}{2}f_x)$ reference signal.

The bandpass filter 4 connected to the modulator 92 is designed to extract the upper sideband from the output signal produced by the above mentioned heterodyning section of the modulator 95.

The chrominance sideband components received at the systems input 10 and extracted and applied to the modulator input terminals 113 and 114 may be considered modulated relative to a chrominance carrier $f_x$ as defined in the above equation (1). This is the case because the deviation Δ effects the original chrominance subcarrier $f_r$ which prevailed at the time of recording of the color video signal.

In consequence, the upper sideband component appearing at the terminals 120 and 121 of the bandpass filter 4 includes chrominance sidebands modulated relative to a frequency of $(f_c + \frac{1}{2}f_x) + f_x$, which amounts to $(f_c + 3/2 f_x)$.

These $(f_c = 3/2 f_x)$ chrominance sideband components are applied to input terminals 123 and 124 of a frequency mixer or modulator 126. A signal of $3/2 f_x$ is applied to another input 128 of the modulator 126.

In principle, the reference signal $3/2 f_x$ could be derived from a second pilot signal recorded or transmitted with the composite signal received at input 10. In this case, a second pilot extractor similar to the extractor 2 would be provided. In the illustrated embodiment, however, the reference signal $3/2 f_x$ is derived from the reference signal $\frac{1}{2} f_x$ derived by the pilot extractor 2 from the composite signal received at the systems input 10.

To this effect, the $\frac{1}{2} f_x$ reference signal appearing at the terminals 87 and 88 in FIG. 2 is applied to input terminals 180 and 181 of a limiter or non-linear amplifier 182 which produces a square-wave of current rich in odd-order harmonics. The limited reference signal is applied to the bandpass filter 6. The combined limiter 182 and bandpass filter 6 act as a frequency multiplier, and the bandpass filter 6 is designed and adjusted so that it is tuned to a frequency band of three times $\frac{1}{2}f_x$.

The resulting reference signal of $3/2f_x$ is applied to an input 185 of the modulator 126 which beats such reference signal with the chrominance sideband components appearing at the modulator input terminals 123 and 124 and being disposed relative to a frequency of $(f_c+3/2f_x)$ as mentioned above.

Among the products of the heterodyning action of the modulator 126, there are lower sideband components disposed about a frequency of:

$$(f_c=3/2f_x)-(3/2f_x)=f_c \tag{6}$$

The fact implicit in the equation (6) means that the products of the heterodyning action of the modulator 126 include chrominance sideband components disposed about the frequency $f_c$ which, as mentioned above, is produced by the local oscillator 90 and is stable, rather than being affected by Δ errors.

The modulator 126 is preferably of a doubly-balanced type to provide, in a manner conventional as such, for a suppression of the new chrominance subcarrier of frequency $f_c$. A broad-band balancing transformer 187 connected to the output 188 of the modulator 126 provides the required balanced modulator load for effective carrier suppresion.

The above mentioned chrominance sideband components disposed about the suppressed stable carrier $f_c$ are extracted from the output of the transformer 187 by a low-pass filter 190 of a conventional Butterworth type having inductances 191, 192 and 193, and capacitors 194, 195, and 196 as shown. The extracted chrominance sideband components are amplified by an amplifier 200 and applied to an input 201 of a summing amplifier 202.

Another input 204 of the summing amplifier 202 receives a luminance component of the composite signal received at the systems input 10. This luminance component is extracted by the luminance bandpass amplifier 3.

The luminance bandpass amplifier 3 includes a tuned filter 210 for rejecting chrominance sideband components from the composite signal received at systems input 10, and a tuned filter 212 for rejecting the $\frac{1}{2}f_x$ pilot signal.

The band not rejectd by the filters 210 and 212 contains luminance information which is amplified in two transistor amplifier stages 214 and 215 and applied to a terminal 216. A delay line 220 is connected to a terminal 218, which is connected to the terminal 216. The delay line 220 may be of a conventional type and is designed to impose on the extracted luninance component a time delay compensating for a like delay experience by the chrominance components in the illustrated chroma processing circuitry. In a prototype, a time delay of about one micro-second was found necessary for the delay line 220.

The appropriately delayed luminance component is applied to a terminal 222 and from there to the summing amplifier input terminal 204 in FIG. 3. The summing amplifier 202 combines the delayed luminance component and the processed chrominance component into a composite color video signal which is applied to a systems output 225 after amplification by two transistor amplifier stages 226 and 227.

Since the chrominance sideband components in the composite signal appearing at the systems output 225 are disposed about a suppressed subcarrier of a frequency of $f_c$ which is stable, it will be appreciated that the apparatus of FIGS. 1 to 3 are operative to correct effects of angular errors in chrominance sideband components of a color video signal. The same result is arrived at if the function of the apparatus of FIGS. 1 to 3 is viewed as disposing chrominance components about a frequency which is displaced from the frequency of the picture carrier of the composite color video signal by a stable frequency difference of $f_c$.

An outstanding feature of the systems pursuant to the subject invention is the ease with which elimination of the above mentioned Δ errors is effected and with which effects of frequence-dependent phase shifts in filter components of the system are automatically precorrected.

This is best seen from the following equation in which:

$\theta$ is a phase angle of a signal;

$\phi$ is an imposed phase shift;

Subscripts 1, 2, 4, 5 and 126 refer to components bearing those reference numberals and, if associated with the symbol $\theta$, designate the phase angle of the output signal of the particular component, and if associated with the symbol $\phi$, designate the phase shift imposed by the particular component on a signal processed by that component;

$t$ designates time;

$n$ is the result of a division of the average frequency of the pilot signal extracted by the pilot extractor 2 by the standard chrominance subcarrier frequency $f_r$ defined above in equation (1);

$m$ is the result of a division of the average frequency of the reference signal provided at the input 185 of the modulator 126 by the standard chrominance subcarrier frequency $f_r$ defined above in the equation (1).

Employing these symbols, the phase angle $\theta_{126}$ of the output signal of the modulator 126, as far as the lower sideband component extracted by the low-pass filter 190 is concerned, may be defined as:

$$\theta_{126}=\theta_4-\theta_6 \tag{7}$$

wherein $\theta_4$ is the phase angle of the output signal of the bandpass filter 4 in FIG. 2 and $\theta_6$ is the phase angle of the output signal of the bandpass filter 6 in FIG 6.

The phase angle $\theta_6$ may, in turn, be expressed as:

$$\theta_6=(m/n)\ \theta_2+\theta_6 \tag{8}$$

wherein $m$ and $n$ are the factors defined above in the second and third paragraphs ahead of equation (7), $\theta_2$ is the phase angle of the output signal of the pilot extractor 2, and $\phi_6$ is the phase shift imposed by the bandpass filter 6.

If $m$ divided by $n$ in equation (8) is rewritten as:

$$m/n = d \quad (9)$$

with $d$being the factor by which the frequency of the pilot signal received at the input terminals 180 and 181 in FIG. 3 is multiplied, then equation (8) may be re-written as:

$$\theta_6 = d\theta_2 = \phi_6 \quad (10)$$

The phase angle $\theta_2$, in turn, may be written as:

$$\theta_2 = nw_xt + \phi_2 \quad (11)$$

with $nw_x$ being the angular frequency of the pilot signal as extracted by the pilot signal extractor 2, and $\theta_2$ being the phase shift imposed by the pilot signal extractor 2.

Incorporating equation (11) into the equation (8), we obtain:

$$\theta_6 = (m/n)nw_xt + (m/n\phi_2 = \phi_6 \quad (12)$$

or $$\theta_6 = mw_xt + (m/n)\ \phi_2 + \phi_6 \quad (13)$$

or, employing equation (9):

$$\theta_6 = mw_xt = d\phi_2 + \phi_6 \quad (14)$$

Equation (7) then becomes:

$$\theta_{126} = \theta_4 - \mathrm{mw}_x\mathrm{t} - \mathrm{d}\phi_2 - \phi_6 \quad (15)$$

This calls for a resolution of the angle $\theta_4$. In this respect, we may write:

$$\theta_4 = \theta_1 + \theta_5 + \phi_4 \quad (16)$$

wherein $\theta_4$ is the phase angle of the output signal of the bandpass filter 4, $\theta_1$ is the phase angle of the output signal of the chroma bandpass amplifier 1, $\theta_5$ is the phase angle of the output signal of the bandpass filter 5, and $\phi_4$ is the phase shift imposed by the bandpass filter 4.

The angles of $\theta_1$ in the equation (16) may be expressed as:

$$\theta_1 = w_xt + \phi_1 \quad (17)$$

wherein $w_x$ is the angular frequency of the above mentioned chrominance subcarrier of frequency $f_x$ about which chrominance sidebands in the composite color video signal received at system input 10 are disposed, and $\phi_1$ is the phase shift imposed by the chroma bandpass amplifier $\phi_1$.

The angle $\theta_5$ in the equation (16) may be expressed as:

$$\theta_5 = w_ct + \theta_2 + \phi_5 \quad (18)$$

wherein $w_c$ is the angular frequency of the stable reference signal produced by the local oscillator 90, $\theta_2$ is the phase angle of the output signal of the pilot extractor 2, and $\phi_5$ is the phase shift imposed by the bandpass filter 5.

Incorporating the equation (11) into the equation (18), we obtain:

$$\theta_5 = w_ct + nw_xt + \phi_2 + \phi_5 \quad (19)$$

According to a preferred embodiment of the subject invention, the phase shift $\phi_5$ is made equal to:

$$\phi_5 = (m/n - 1)\ \phi_2 \quad (20)$$

which as indicated by equation (9) may also be written as:

$$\phi_5 = (d - 1)\ \phi_2 \quad (21)$$

Incorporating the equation (21) into the equation (19), we obtain:

$$\theta_5 = w_ct + nw_xt = d\theta_2 \quad (22)$$

Incorporating equations (17) and (22) into the equation (16). we obtain:

$$\theta_4 = w_xt = \phi_1 + w_ct + nw_xt + d\phi_2 + \phi_4 \quad (23)$$

or $$\theta_4 = \mathrm{w}_c\mathrm{t} + (1 + \mathrm{n})\ \mathrm{w}_x\mathrm{t} + \phi_1 + \mathrm{d}\phi_2 + \phi_4 \quad (24)$$

In accordance with a further preferred embodiment of the invention, the requirement is made that the sum of the phase shifts imposed by the chroma bandpass amplifier 1 and by the bandpass filter 4 be equal to the phase shift imposed by the bandpass filter 6. This may be expressed mathematically as:

$$\phi_1 + \phi_4 = \phi_6 \quad (25)$$

Inserting equation (25) into the equation (24), we obtain:

$$\theta_4 = w_ct = (1 + n)\ w_xt + d\phi_2 + \phi_6 \quad (26)$$

Incorporating the equation (26) into the equation (15) we obtain:

$$\phi_{126} = w_c t + (1+n)\ w_x t + d\phi_2 + \phi_6 - m w_x t - d\phi_2 - \phi_6 \quad (27)$$

or $$\theta_{126} = w_c t + (1 + n - m)\ w_x t \quad (28)$$

In accordance with a further preferred embodiment of the subject invention, the requirement is made that $$m = (1 + n) \quad (29)$$

with the factors $m$ and $n$ having been defined above in the second and third paragraph ahead of the equation (7).

Incorporating the equation (29) into the equation (28), we find that:

$$\theta_{126} = w_c t \quad (30)$$

This means that the output signal of the modulator 126, that is, of the last modulator in the chroma signal processing channel, is free of the error component $w_x$ or $f_x$, and is free of frequency-dependent phase shifts occasioned by the chroma bandpass filter 1, the pilot extractor 2, and the bandpass filters 4, 5 and 6.

Freedom from the error components $w_x$ or $f_x$ is, of course, essential if the system is to perform its correcting function. Pursuant to the equation (29), this freedom is effected by a selection of the factors $n$ and $m$. In the illustrated embodiment, the pilot signal extracted by the pilot extractor 2 has a frequency of $\frac{1}{2} f_x$, so that the factor $n$ is equal to ½, while the reference signal provided by the pilot signal frequency multiplier has a frequency of $3/2\ f_x$, so that factor $m$ is equal to 3/2. Inserting these values into the equation (29), we find that:

$$3/2 = (1 = \tfrac{1}{2}) \quad (31)$$

so that the generally applicable conditions for error effect correction are, indeed, satisfied by the illustrated embodiment.

Incorporating the equation (9) into the equation (29), we find that:

$$d = (1 + 1/n) \quad (32)$$

which means that the frequency multiplication factor of the components 6 and 182 in FIG. 3 is to be chosen equal to one plus the reciprocal value of the factor of n by which the frequency of the signal $f_r$ as defined in equation (1) is multiplied to obtain the average frequency of the pilot signal extracted by the pilot extractor 2. In the illustrated embodiment, this means that $$1 + 2 = 3 \quad (33)$$

so that the pilot signal frequency multipliers 6 and 182 in the illustrated embodiment has to operate as a pilot signal frequency tripler.

Freedom from the frequency-dependent phase shifts $\phi_2$ and $\phi_5$ is in accordance with equation (21) obtained by an appropriate design of the pilot extractor 2 and the bandpass filter 5 relative to the frequency multiplication factor of the components 6 and 182. If the latter operate as a frequency tripler as in the illustrated embodiment, then:

$$\phi_5 = 2\phi_2 \quad (34)$$

as may be seen from equation (21).

Since magnitudes of frequency-dependent phase shifts $\phi_1$, $\phi_4$ and $\phi_6$ by compliance with equation (25) factor $k$ of a filter, and since Q and $k$ are subject to design parameters, as is well known in electric filter technology (see also the above discussion of the coupling factor k in connection with the description of the filter 17 in FIG. 1), it follows that the equations (20), (21) and (34) may be satisfied by appropriate filter design in accordance with conventional design methods.

From this fact, it follows that freedom from the phase shifts $\phi_1$, $\phi_4$ and $\phi_6$ by compliance with equation (25) can be brought about by an appropriate design of the components 1, 4 and 6.

These facts are of enormous importance in the system according to the invention, since they permit use of high-quality or high-Q filter without the frequency-dependent phase shift distortions that would in the absence of the subject invention result therefrom.

While specific preferred embodiments have been described and illustrated herein, variations and modifications thereof within the spirit and scope of the invention will be apparent or suggest themselves to those skilled in the art.

I claim:

1. A bandpass filter having a predeterminable coupling factor, comprising in combination:

a pair of input terminals;

a pair of output terminals;

a first transformer having a first terminal connected to one of said input terminals, a second terminal connected to the other of said input terminals, a third terminal, a fourth terminal, a first primary winding connected to said first and second terminals, and a first secondary winding connected to said third and fourth terminals;

a second transformer having a fifth terminal, a sixth terminal, a seventh terminal connected to one of said output terminals, an eighth terminal connected to the other of said output terminals, a second primary winding connected to said fifth and sixth terminals, and a second secondary winding connected to said seventh and eighth terminals;

first capacitive means connected to said first primary winding for providing a tuned input for said first transformer; and means for coupling said first secondary winding to said secondary primary winding consisting essentially of a lead connecting said third terminal to said sixth terminal and second capacitive means connected between said fourth and fifth terminals and providing a tuned input for said second transformer;

said bandpass filter having a predeterminable coupling factor, $k$, of $$k=\left(\frac{1}{(N_{21}/N_{12})^2+1}\right)^{1/2}$$

wherein:

$N_{12}$ is the number of turns of said first secondary winding; and $N_{21}$ is the number of turns of said second primary winding.

2. A bandpass filter as claimed in claim 1, wherein: said first transformer has an adjustable core.

3. A bandpass filter as claimed in claim 1, wherein: said second tansformer has an adjustable core.

4. A bandpass filter as claimed in claim 1, wherein: said lead connecting said third terminal to said sixth terminal is isolated from ground.

* * * * *